June 1, 1937.  L. W. STETTNER  2,082,227
GAS PRESSURE REGULATOR
Filed Dec. 14, 1935
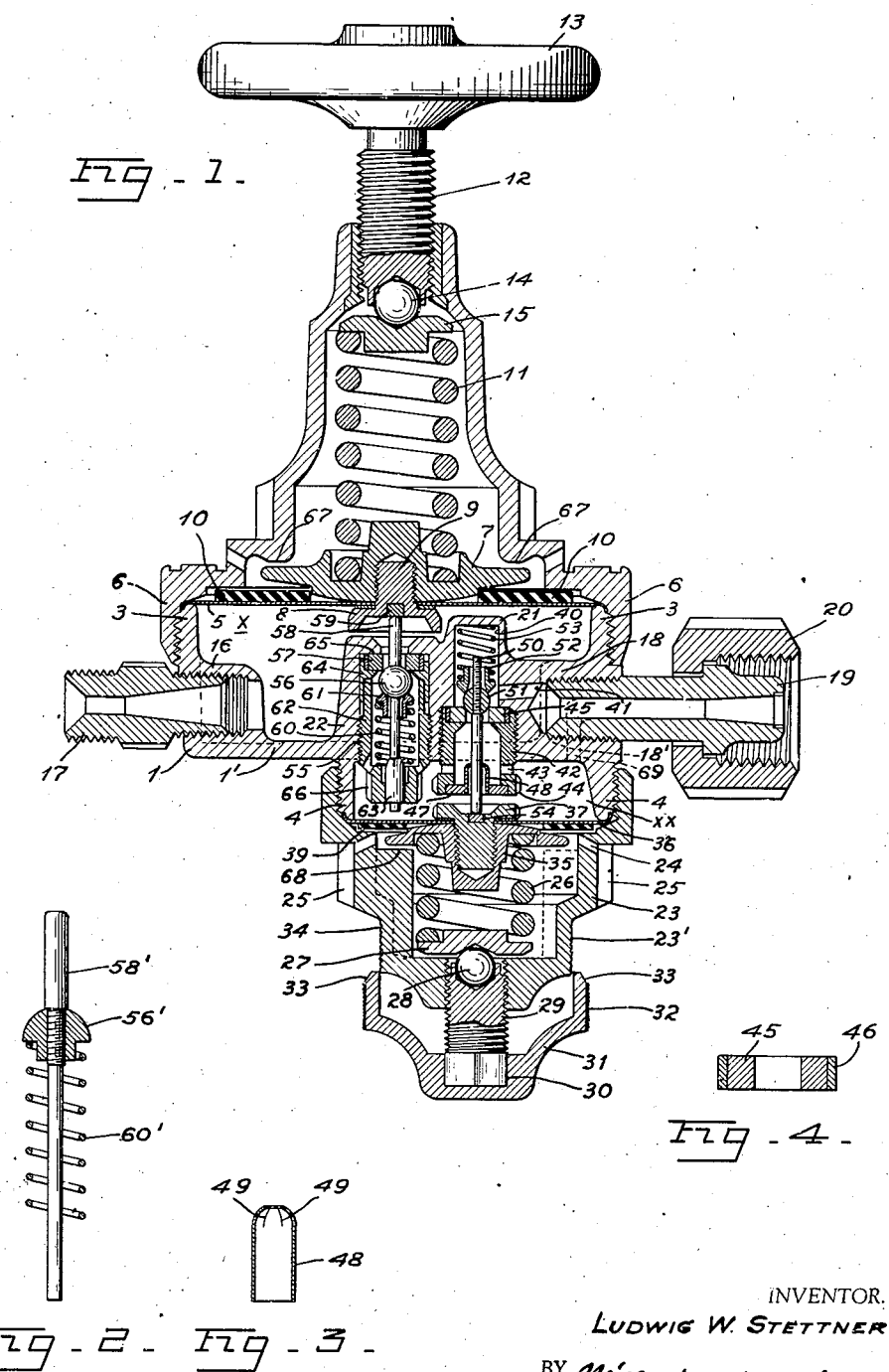
INVENTOR.
LUDWIG W. STETTNER
BY *Miller Boyken & Bried*
ATTORNEYS Patented June 1, 1937

2,082,227

UNITED STATES PATENT OFFICE 2,082,227

GAS PRESSURE REGULATOR

Ludwig W. Stettner, Oakland, Calif., assignor to Victor Welding Equipment Co., San Francisco, Calif., a corporation of Delaware Application December 14, 1935, Serial No. 54,440

5 Claims. (Cl. 50—23)

This invention relates to automatic pressure regulating valves for maintaining any desired constant reduced working pressure from a source of high gas pressure, for use in gas welding and cutting, as well as for reduction of gas pressure for any purpose desired.

The object of the invention is to provide improvements in the construction of such regulators which will make for simplification and more reliable operation. Another object is a pressure regulator in which the valve member will not be put out of order by frost. Another feature is a two or more stage gas pressure regulator in which all of the valves and associated parts may be inserted or removed from the bottom. Still another feature is the design of the body member for a two or more stage regulator which is adapted to be made by hot forging. Other features and advantages will appear in the following description and accompanying drawing.

In the drawing Fig. 1 is a vertical cross section of a two stage gas pressure regulator made in accordance with my invention.

Fig. 2 is an enlarged vertical cross section of a stem guiding nipple used in my improved regulator.

Fig. 3 is an enlarged vertical section showing a modification of the valve and stem assembly.

Fig. 4 is an enlarged cross section of the renewable valve seat or ring.

In further detail the drawing shows (in somewhat larger than average size) a two stage gas pressure regulator comprising a circular body member 1 formed with a large cup-like pocket or chamber X in its upper side surrounded by a circular threaded rim 3, and an eccentrically arranged circular threaded rim 4 projecting from its lower side forming a smaller circular chamber XX. The construction from rim 3 upward is substantially identical with that shown and claimed in my issued Patent No. 1,918,720 and includes the rim of the chamber X being rounded on its upper edge and supporting a thin resilient metal cupped edge diaphragm 5 which is clamped thereover by a vented upper bonnet member 6 screwed over the rim and within which bonnet is a backing washer member 7 secured to the center of the diaphragm by means of an inverted cup-shaped flange member 8 having a threaded stem 9 passing through the diaphragm and into the washer 7. A rubber backing washer or cushion 10 above the diaphragm, a coiled compression spring 11 centered on the washer 7 adjustably compressed by the threaded spindle 12 of a handwheel or handle 13 operating against a hard ball 14 in turn resting in a pocket formed in a centering spring cap 15.

The body is formed with one or more inwardly projecting bosses 16 threaded internally and fitted with suitable threaded outlet pipe nipples 17 for leading the low pressure gas to any desired equipment, while on one side of the body is a boss 18 threaded interiorly to receive any desired pipe inlet nipple or connection such as indicated at 19, 20, for connecting to the high pressure source of gas which is to be reduced after passing through the mechanism.

Within the body and projecting into the low pressure chamber X are bosses 21, 22, housing respectively the high and low pressure valve mechanisms to be later described in detail, while screwed over the threaded rim 4 is a lower bonnet 23 vented at 24 formed with wrench faces 25 and housing a heavy coiled compression spring 26 which is centered at its lower end in a hubbed washer 27 formed with a depression on its under side seated on a hardened ball 28 in turn resting on the hollow upper end of a screw 29 threadedly engaging an opening in the lower end of the bonnet and which screw is firmly secured at its outer end at 30 in a socket formed in a cup-shaped hand nut 31 knurled around its periphery at 32 and chamfered off around its upper edge at 33 so as to make a sharp edge to read against pressure denoting graduation lines 34 circumferentially engraved around the outside of lower cylindrical portion 23' of bonnet 23 so that the adjustment of pressure of spring 26 with hollow knurled nut 31 may be accurately determined.

The upper end of spring 26 is centered around a flanged hub 35 or backing washer clamped to the under side of a second smaller metal diaphragm 36 by means of a flange member 37 provided with a threaded extension passing through the diaphragm and screwed into a recess in member 35 in the same manner as described for the larger upper diaphragm 5. The lower diaphragm 36 is similarly clamped over its supporting rim 4 by the bonnet 23 and also provided with a soft rubber or other cushioning washer 39.

Interior bosses 21, 22 and 18 are integral with the bottom or lower web 1' of upper or low pressure chamber X so as to divide it from the smaller or intermediate pressure chamber XX and both bosses 21 and 22 are vertically bored from below and fitted with valve mechanisms which may be entirely withdrawn or inserted from below upon unscrewing lower bonnet 23. The bore 40 in boss 21 terminates below the top of the boss and connects at one side to inlet nipple 19 by a laterally extending bore 41. The lower end of bore 40 is enlarged and threaded to receive a threaded cylindrical housing 42 which is side-ported at 43 to chamber XX and formed with wrench faces at 44 so that it may be screwed in tightly to clamp a flat annular valve seat 45 up against a flat step in bore 40 at the point where it is reduced in diameter. This annular valve seat is of a suitable non-corrosive metal or alloy preferably a trifle softer than Monel metal and is enclosed in a ring 46 of stronger metal to prevent its spreading when clamped on the flat shoulder of the bore by the threaded housing 42. The lower end of housing 42 is fitted with an apertured disk 47 in the aperture of which is pressed a small tubular guide member 48 split at its upper end as at 49 (see Fig. 2) and converged to form a resilient guide for valve stem 50 which passes through the housing and valve seat 45 and has a metal ball 51 secured to it near its upper end seating in the aperture of the metal valve seat. This ball is preferably of Monel metal and is threaded and soldered to the stem, and surrounding the stem above it is a loose collar 52 supporting a coiled spring 53 which reacts against the upper end of the bore 40 to close the ball valve upon the seat. The lower end of stem 50 is slightly rounded and rests on a hard metal button 54 or stainless steel plug inserted in the diaphragm clamping member 37. The valve assemblage just described may be termed the high pressure valve and the other one to be described the low pressure valve.

The low pressure valve assemblage housed in a bore 55 in boss 22 is substantially identical to the high pressure valve assemblage except that it is inverted, the ball 56 being below the annular valve seat 57 and the upper end of the valve stem 58 impinging against a stainless steel or other hard metal insert 59 in member 9 clamped to the center of the upper diaphragm 5. The closing spring 60 is below the ball with its upper end against collar 61 loose on the stem, and its lower end supported within the valve housing 62 which screws into the lower end of the bore 55 and is provided with a resilient frictional guide 63 for the valve stem, same as the guide 48 for the other valve previously described. The annular valve seat 57 is a duplicate of valve seat 45 but is centered in a shouldered sleeve 64 which fits easily in bore 55 and which sleeve is engaged by the inner end of the threaded housing 62 for forcing the flat annular seat 57 gas-tight against a flat internal shoulder 65 at the outlet of bore 55 to low pressure chamber X. Valve housing 62 is also provided with wrench faces 66.

In considering the ball valves, it should be noted that the metal seats are relatively thick, the openings in the seats are about ⅔ the diameter of the balls and the valve stems are only about half the diameter of the openings. This leaves the balls perfectly free to move around to seat properly, and being spherical they seat perfectly slightly within the round opening, the extreme sharp corner of which is preferably removed. It is manifest that since it is only the spherical surface adjacent the annular seat which is used to close the opening, that a complete ball is not necessary, and the valve could be made as shown in Fig. 3 where a half-ball 56' is used by screwing and soldering to stem 58' and the under side of which half-ball is shouldered to center the closing spring 60'. However, it is found in practice easier to drill and tap a Monel metal ball as at 56 than to make the half-balls 56'. This ball surface operating or seating partially within and contacting the edge of a circular hole in a metal valve seat has been found to entirely overcome the effect known as "freezing" or building up of ice on the ball and seat at the very point of seating, due to water vapor content of high pressure gases expanding through small clearances.

To remove or insert the valve mechanisms it is simply required to unscrew the lower bonnet 23 to make either or both freely accessible.

While the drawing shows but one outlet nozzle 17 it is manifest there may be several around the regulator body 1, and that there may also be one or more outlets from the intermediate stage or chamber XX from bosses 18' about like 18 but tapped downward as at 69 into chamber XX. The internal form of the body member 1, before drilling and tapping for the valves, intake and outlet valves, provides draft to forging dies so that it may be forged out of a piece of hot bronze and the dies withdrawn. This makes a very dense gas-tight body from high grade metal.

The drawing shows a two-stage regulator, but it is manifest that the high pressure assemblage may be omitted from a single stage regulator. The movements of both diaphragms are limited inwardly by members 8 and 37 respectively, and also limited outwardly by shoulders 67 and 68 which respectively stop excessive movement of diaphragm backing washers 7 and 35.

In operation the handle 13 and hand nut 31 are adjusted for the pressures desired, as noted on suitable pressure gages connected with the respective chambers X and XX and as soon as the desired pressures are reached the ball valves will close through pressure on the diaphragms counteracting the springs in the usual way, and of course the ball valve will open up at a drop below the set pressures.

Having thus described my improvements in a gas pressure regulator of this kind, what I claim is:

1. In a gas pressure regulator of the spring-controlled diaphragm type, a low pressure chamber with service outlet connection and a high pressure chamber, a separate spring-controlled diaphragm removably clamped in place closing each chamber and each diaphragm provided with a central flange member, a passageway connecting the two chambers fitted with a spring-closed stemmed valve controlled by the low pressure chamber diaphragm, and a high pressure gas inlet passageway to the high pressure chamber fitted with a spring-closed stemmed valve controlled by the high pressure chamber diaphragm, the stems of the valves impinging at one end centrally on the flange members of their respective diaphragms and means whereby both of said valves and associated parts may all be independently withdrawn from the high pressure chamber when its diaphragm is removed, both chambers being of round form and the high pressure chamber being smaller and arranged in eccentric relation on the bottom of the larger low pressure chamber.

2. In a construction as specified in claim 1, the two valves provided with stems and operating in parallel bores in the body of the regulator within the area of the smaller high pressure chamber, the stems of the valves being centered with their respective controlling diaphragms.

3. In a construction as specified in claim 1, the two valves provided with stems and operating in parallel bores in the body of the regulator within the area of the smaller high pressure chamber, the stems of the valves being centered with their respective controlling diaphragms and each bearing on a hard insert in a relatively soft clamping nut in the center of its diaphragm.

4. In a construction as specified in claim 1, the two valves provided with stems and operating in parallel bores in the body of the regulator within the area of the smaller high pressure chamber, the stems of the valves being centered with their respective controlling diaphragms, threaded tubular housings in which the valve stems operate screwed into bores in the body between the two chambers and both formed with wrench faces accessible from the high pressure chamber.

5. In a construction as specified in claim 1, the two valves provided with stems and operating in parallel bores in the body of the regulator within the area of the smaller high pressure chamber, the stems of the valves being centered with their respective controlling diaphragms, threaded tubular housings in which the valve stems operate screwed into bores in the body between the two chambers and an annular metal valve seat held in place against a shoulder in the respective bores by said threaded tubular housings.

LUDWIG W. STETTNER.